United States Patent
Shaw et al.

(10) Patent No.: US 7,539,881 B2
(45) Date of Patent: May 26, 2009

(54) SYSTEM AND METHOD FOR DYNAMICALLY ADJUSTING POWER CAPS FOR ELECTRONIC COMPONENTS BASED ON POWER CONSUMPTION

(75) Inventors: Mark E. Shaw, Richardson, TX (US); Christian L. Belady, Richardson, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 480 days.

(21) Appl. No.: 11/404,455

(22) Filed: Apr. 15, 2006

(65) Prior Publication Data
US 2007/0245161 A1    Oct. 18, 2007

(51) Int. Cl.
  *G06F 1/26*   (2006.01)
(52) U.S. Cl. ....................... 713/300; 713/320
(58) Field of Classification Search ................. 713/300
See application file for complete search history.

(56) References Cited

U.S. PATENT DOCUMENTS

| | | | | |
|---|---|---|---|---|
| 6,586,963 | B2* | 7/2003 | Choi et al. | 326/26 |
| 6,765,434 | B2* | 7/2004 | Mizuno | 327/544 |
| 7,243,243 | B2* | 7/2007 | Gedeon | 713/300 |
| 2002/0062454 | A1* | 5/2002 | Fung | 713/300 |
| 2003/0005339 | A1* | 1/2003 | Cohen et al. | 713/300 |
| 2004/0003303 | A1* | 1/2004 | Oehler et al. | 713/300 |
| 2004/0117680 | A1* | 6/2004 | Naffziger | 713/322 |
| 2005/0102544 | A1* | 5/2005 | Brewer et al. | 713/320 |
| 2006/0167657 | A1* | 7/2006 | Naffziger et al. | 702/182 |
| 2007/0050646 | A1* | 3/2007 | Conroy et al. | 713/300 |

* cited by examiner

*Primary Examiner*—Nitin C Patel (57) ABSTRACT

A system has a plurality of electronic components that are powered by a power source, and each of the components is associated with a respective power cap. The system further has logic configured to monitor power consumption of the electronic components over a duration and dynamically adjust at least one power cap associated with at least one of the electronic components based on the monitored power consumption.

13 Claims, 6 Drawing Sheets

SYSTEM AND METHOD FOR DYNAMICALLY ADJUSTING POWER CAPS FOR ELECTRONIC COMPONENTS BASED ON POWER CONSUMPTION

BACKGROUND

Computing device components, e.g., central processing units (CPU), and memory subsystems, are steadily evolving in order to provide faster operating speeds. As the speeds of such components increase, their power consumption requirements also increase. Further, as the power consumption requirements of the components increase, so does the overall power consumption of the computing device, e.g., a server or a datacenter. However, computing devices often have power consumption limits, e.g., the power source supplying the power has a maximum power rating, the computing device is limited by externalities like a power cord or a circuit breaker, or a user of the computing device may have desired limits designed to control costs associated with power consumption.

A computing device often executes distinct applications, and each application may be designed to perform a separate and distinct function. For example, an application may collect data, organize the collected data, and store the organized data in memory. In another example, an application may generate a report based upon the collected, organized, and stored data described. Oftentimes, the function of an application dictates which components, e.g., memory subsystem, input/output subsystem, or CPU, in the computing device are used frequently and to what extent each of these components is used. For example, if the application being executed on the computing device is collecting data, the application may perform a greater number of memory access operations as opposed to performing floating point operations, which are CPU intensive. Generally, as the activities performed by a component increases, so does the component's consumption of power.

SUMMARY OF THE DISCLOSURE

Generally, the present disclosure provides a power management system and method for monitoring power usage and controlling operation of system components based upon the monitored power usage.

A power management system in accordance with an embodiment of the present disclosure comprises a plurality of electronic components that are powered by a power source, and each of the electronic components is associated with a respective power cap. The system further has logic configured to monitor power consumption of the electronic components over a duration and dynamically adjust at least one power cap associated with at least one of the electronic components based on the monitored power consumption.

A power management method in accordance with an exemplary embodiment of the present disclosure comprises monitoring power consumption of a plurality of electronic components over a duration; and dynamically adjusting a power cap associated with at least one of the components based on the monitored power consumption.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Embodiments of the present disclosure generally pertain to systems and methods for dynamically allocating and distributing power to one or more components of a computing device. In particular, a system in accordance with one embodiment of the present disclosure dynamically monitors power consumption of a plurality of components, e.g., memory subsystem, CPUs, input/output subsystem, etc., in a computing environment, e.g., a server or a datacenter. In response to indications of increased and/or decreased power consumption of the components, the system dynamically adjusts operating power caps associated with the components in an attempt to optimize performance of the system per Watt of power consumed by the system.

In particular, an exemplary system may have power limits prescribed for various components due to various possible facts, such as, for example, a maximum power rating on the system's power source, external power limitations, such as a power cord or a circuit breaker, or user-imposed power consumption limitations. In such a system, over a given time duration, power consumption of the various components may vary. However, the system continues to be constrained by one or more of the prescribed power limits.

A system in accordance with one embodiment of the present disclosure maintains the overall power consumption of the system within a prescribed limit but varies power consumption caps of the plurality of components of the system in order to optimize performance during execution of a particular application. For example, an application executed by the system may access a first component, such as a memory subsystem, an input/output subsystem, a CPU, etc., frequently and extensively, but the application may not require computationally intensive functionality that would require access of another component, such as a memory subsystem, an input/output subsystem, a CPU, etc. Thus, during a period that the application is running, the power consumed by a first component may significantly increase to a level close to its associated power cap, and the power consumed by a second component may decrease significantly below its associated power cap. In such a situation, the system increases the power cap of the first component and decreases the power cap of the second component without violating the overall power limits prescribed for the system.

Accordingly, in the exemplary embodiment, the system increases power caps associated with those components accessed frequently and extensively and decreases power caps associated with those components that are not accessed as frequently and extensively. Therefore, the system redistributes power across the plurality of components based upon each component's dynamically determined usage while still maintaining overall power consumption of the system under any prescribed overall power consumption limit. Note that in such a scenario, more power would be consumed by the more frequently accessed components.

Indeed, in one exemplary embodiment of the present disclosure a system monitors the power consumed by each component, detects an increase and/or decrease in power consumption requirements of each component, and redistributes the power that is available across the components based on each component's need. In this regard, the system may increase a power cap associated with a particular component if the power consumed by the component meets and/or exceeds a threshold, such as its current power cap, over a predetermined duration thereby improving and optimizing the component's performance. Further, in order to ensure that the overall power limit for the system is not violated due to the component's increased power cap, the system decreases the power cap of another component based on that component's current power usage. In this regard, the system identifies one or more components that are being underutilized relative to their current power caps and lowers the power caps of these components by a sufficient amount to ensure that the overall power limit for the system is not violated. Accordingly, more power is allocated to the highly active component without significantly impacting operation of the other components in an adverse way and without violating the overall power limit for the system.

In one exemplary embodiment, a system further comprises logic for controlling power consumption by controlling power consumed per one or more logic boards, which is described in more detail with reference to FIG. 7. In such an embodiment, the logic may adjust operating power caps associated with the logic boards based upon detected power consumption of the logic boards.

Figure 1:
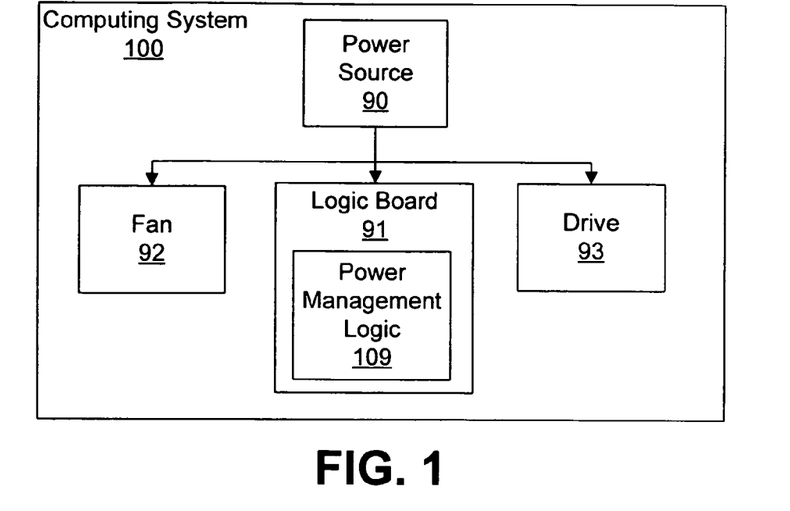
FIG. 1 is a block diagram illustrating a computing system in accordance with an exemplary embodiment of the present disclosure.

FIG. 1 is a block diagram illustrating a computing system 100 comprising at least one power source 90, fan 92, drive 93, and logic board 91 in accordance with an exemplary embodiment of the present disclosure. The logic board 91 comprises power management logic 109, in addition to other components described in more detail with reference to FIGS. 2 and 3. Note that the computing system 100 may be, but is not limited to, for example, a server, a datacenter, or a personal computer (PC).

An exemplary power source 90 converts 110-115 or 220-230 Volt alternating current (AC) into low voltage direct current (DC). However, other types of power sources are possible in other embodiments. For example, the power source 90 may also convert DC to DC or any other combination of AC/DC conversion known in the art, and the power source may convert or otherwise provide other voltage values.

The power source 90 supplies the converted DC voltage to various components within the computing system 100, e.g., a motor (not specifically shown) for driving the fan 92, digital circuits (not specifically shown) of the logic board 91, or the motors (not specifically shown) of the drive 93. The power source 90 may, for example, supply 5 Volts to the logic board 91 to drive digital circuits residing thereon or 12 Volts to the fan 92 or the drive 93. Note that the fan 92, the logic board 91, and the drive 93 are depicted for exemplary purposes, and other embodiments of the computing system 100 may comprise other components requiring power that may be supplied by the power source 90.

As described hereinabove, power consumption of the computing system 100 may be limited by an overall power limitation, such as a user-imposed power consumption limit, an external hardware power consumption limit such as a limit due to a power cord or a circuit breaker, or a limit based upon a power rating of the power source 90.

The power source 90 may supply a plurality of voltages, e.g., +5 Volts, +12 Volts, +3.3 Volts. In another embodiment, the power source 90 is a battery that also supplies a plurality of voltages, e.g., +5 Volts, +12 Volts, +3.3 Volts, to the system 100.

Nonetheless, for each voltage supplied by the power source 90, there is a respective maximum current output. In such an exemplary power source 90, the maximum power for the source 90 may be 150 Watts.

Thus, at a minimum, the power source 90 exhibits a power rating that is at least consistent with the amount of power that is needed to concurrently power each of the elements, e.g., the fan 92, the logic board 91, and the drive 93, to receive power from the power source 90. Furthermore, in the exemplary power source 90 being described, assume that 150 Watts is specified the overall power limit for the system 100. In this regard, the total power supplied by the power source 90 at any given instant should not exceed 150 Watts in order to prevent violation of the overall power limit.

As an example, assume that the fan 92 requires +5 Volts and 1 amp, the logic board 91 requires 12 Volts and 10 amps, and the drive 93 requires 5 Volts and 5 amps. Note that the term "drive" may refer to any type of known or future-developed drive, such as a hard drive (not shown), a compact disc read only memory (CDROM) drive (not shown), a floppy drive (not shown), etc. In the instant example, at a minimum, the power source 90 would provide at least 150 Watts. Note that 150 Watts is a exemplary value, and other values corresponding to the power source are possible in other embodiments. Further, there may also be other optional devices, for example, network interface cards, small computer system interface (SCSI) cards, peripheral component cards, or graphics cards, each of which would also require power to operate.

As noted herein, in an exemplary computing system 100, the logic board 91 comprises the power management logic 109. The power management logic 109 monitors power consumption of a plurality of components, described further with reference to FIG. 2. If one or more of the components consumes power over a period of time that significantly exceeds or falls below a power consumption cap designated for the particular component, then the power management logic 109 dynamically increases or decreases, respectively, the power consumption cap for the particular component. Note that the power consumption cap or "power cap" refers to a value indicative of the maximum amount of power at which the particular component is allowed to operate. Therefore, if an application that is being executed by the system 100 frequently and extensively uses a first component, then over time the component may meet and/or exceed its associated power cap. By allocating the component additional power, the power management logic 109 may improve the performance of the particular component. Thus, the power management logic 109 increases the power consumption cap associated with the first component in response to increasing power usage patterns, which improves performance of the component. Furthermore, if the application does not frequently or extensively access a second component, the power management logic 109 may decrease the power consumption cap associated with the second component in response to decreasing power usage patterns. Such decrease allows the system 100 to increase other power caps by a corresponding amount so that such an increase does not increase the overall power consumed helping the system to remain within any prescribed overall power consumption limit.

As described hereinabove, the system 100 dynamically controls power consumption of components in the system by dynamically modifying power caps associated with the components based upon dynamically obtained power consumption values of the components. In this regard, if power consumption of the components over a period of time remains substantially constant, then the system 100 does not increase or decrease any power caps associated with one or more components, despite a limited request for additional power. However, if one or more components on the system experiences consistent increased usage over a predetermined period of time indicating that significant additional power is needed to boost performance of the system 100, then the system 100 modifies the power caps accordingly. Likewise, if one or more components on the system experiences decreased usage over a period of time as a result of the executing application, the system 100 may decrease the one or more component's power caps in order to ensure that the overall power consumption of the system 100 remains within a prescribed power consumption limit. Thus, the system 100 optimizes performance and power consumption by increasing power caps of components that experience increased activity and decreasing power caps of components that experience decreased activity as a result of an executing application.

In this regard, if there is increased activity by a component over a predetermined period, then the current being drawn by the component increases. Such an increase in current increases the power consumed by the component. Thus in order to drive the operations needed to ensure that performance is not degraded additional power may be allocated to the component. On the other hand, if there is decreased activity by a component, the power consumption caps for the particular components are decreased in order to keep the system 100 overall within its prescribed power consumption limit.

As one example, if the computing system 100 is a web server that allows a plurality of internet protocol addresses access to the web, then there are certain periods through a twenty-four hour period that the computing system 100 is likely to experience heavy traffic. For example, in the evening hours, many more individuals typically log on to their respective computers to check email, as opposed to during business hours. Thus, it is likely that an input/output subsystem would experience increased activity, but the memory subsystem may not. Therefore, in such an example, it is likely that the computing system 100 would experience heavier traffic during such a period and the input/output subsystem of the computing system 100 would be used heavily during such period. The system 100 would then ensure that additional power resources are provided to the input/output subsystem and the system 100 may allocate power from the memory subsystem to the input/output subsystem.

During operation, the power management logic 109 may determine that, during a period of time, the system 100 exhibits characteristics of increased activity, e.g., determines that an input/output subsystem component is operating at or close to its power cap. During such a period, the power management logic 109 may detect the input/output subsystem component is reaching its power cap at least a predetermined percentage of the time over a measured interval (e.g., thirty minutes). As an example, over a given time interval, the component may be reaching or coming substantially close to its associated power cap an amount of time above a specified threshold, e.g., at least seventy-five percent of the time during a thirty minute interval. In response to a determination that the component is reaching or coming substantially close to its associated power cap at least seventy-five percent of the time during the thirty minute interval in such an example, the power management logic 109 raises the power cap of the input/output subsystem component in order to enhance performance of the particular component. In this regard, the increased power cap associated with the component enables the component to operate at a higher power consumption level.

Furthermore, the power management logic 109 may detect that the processor component is not reaching its power cap at least a predetermined percentage of the time over the measured interval (e.g., the aforedescribed thirty minutes). In response to such detection that the component is not reaching or coming substantially close to its associated power cap, the power management logic 109 decreases the power cap of the processor component in order to offset for the increased power consumption by the input/output subsystem, as described hereinabove. Thus, the power management logic 109 maintains power consumption overall at the system's prescribed limit while still optimizing performance by dynamically redistributing power to those components that need additional power and decreasing power allocated to those components that are not necessarily being used during the particular period.

Figure 2:
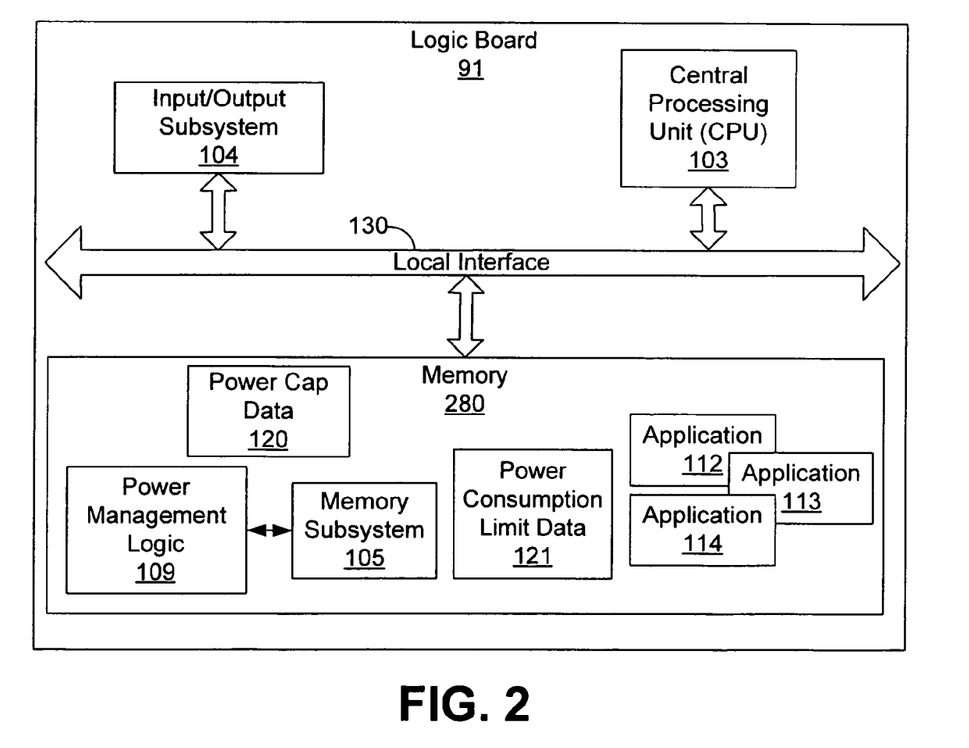
FIG. 2 is a block diagram illustrating an exemplary logic board, such as is depicted in FIG. 1.

FIG. 2 depicts the logic board 91 in accordance with an exemplary embodiment of the present disclosure, such as is depicted in FIG. 1. In this regard, the logic board 91 comprises a plurality of components, including a central processing unit (CPU) 103, an input/output subsystem 103, and memory 280. Note that the components shown are for exemplary purposes and other components may be implemented on the logic board 91 in other embodiments.

The memory 280 comprises a plurality of applications 112-114 and a memory subsystem 105. Note that the power management logic 109 may be implemented in hardware, software, or a combination thereof. In one embodiment, the power management logic 109 is implemented in software and stored in memory 280, as is depicted in FIG. 2.

Note that the power management logic 109, when implemented in software, can be stored and transported on any computer-readable medium for use by or in connection with an instruction execution apparatus that can fetch and execute instructions. In the context of this document, a "computer-readable medium" can be any means that can contain, store, communicate, propagate, or transport a program for use by or in connection with the instruction execution apparatus.

Memory 280 further comprises power cap data 120 and power consumption limit data 121. The power cap data 120 comprises data values indicative of a plurality of power cap values associated with the plurality of components 103-105. Furthermore, the power consumption limit data 121 comprises data values indicative of at least one maximum power limit value related to the system 100 as described herein.

During operation, the power source 90 (FIG. 1) delivers power at a particular voltage to the logic board 91. Each of the components on the logic board 91, e.g., the input/output subsystem 104, the CPU 103, and the memory subsystem 105, is driven by the power source 90. As described herein, the power available for the logic board 91 may be limited any number of ways known in the art.

In one embodiment, the power management logic 109 may dynamically determine initial power caps for the input/output subsystem 104, the CPU 103, and the memory subsystem 105 based upon current that is being drawn by the components. In another embodiment, the power management logic 109 may use predefined power cap values. The power management logic 109 stores such values as the power cap data 120.

Further, the power management logic 109 determines any prescribed power consumption limits for the system 100. For example, the system 100 may comprise a user interface (not shown) in which a user of the system 100 may enter data indicative of a user-imposed power consumption limit. The power management logic 109 stores such power consumption limits as power consumption limit data 121.

During operation, one of the applications 112-114 may begin to execute. As described hereinabove, each of the applications 112-114 may require usage of one of the components, e.g., the CPU 103, the input/output subsystem 104, or the memory subsystem 105. Further, the applications 112-114 may use one of the components more frequently or extensively than the others.

Thus, during execution, the power management logic 109 dynamically compares the power that is being consumed by each individual component 103-105 to its respective power cap value over a particular period of time (e.g., 60 minutes), referred to as a "sample period." Note that an exemplary technique for determining the power being consumed is to obtain a value indicative of the current being drawn by the particular component and calculate the power being consumed using such obtained current value and the voltage being supplied to the component, e.g., power equals voltage multiplied by current. Other techniques known in the art or future-developed may be used to determine dynamically the power that is being consumed. If the power cap value for a particular component is being reached at least a predetermined percentage of the sample period, then the power management logic 109 increases the power cap value. However, in one embodiment, the power management logic 109 determines if the overall power being consumed by the system 100 meets or exceeds the power consumption limit. In this regard, the power management logic 109 calculates the total power being consumed by the system and compares the total with a power consumption limit value stored in the power consumption limit data 121.

If increasing the power cap of the component increases the probability that the total power consumption will be above the power consumption limit, then the power management logic 109 determines if any other component on the system 100 is being underutilized. If so, then the power management logic 109 decreases the power cap value associated with the underutilized component, which may decrease ensure that the overall power consumption limit is not reached.

As described, if the power cap for the particular component is increased thereby increasing the power consumed overall, the power management logic 109 determines if one or more components is not being used as frequently and extensively by the executing application 112-114. In this regard, if the power consumed by another component is substantially below its associated power cap value at least a predetermined percentage of the sample period, then the power management logic 109 decreases the power cap value. By increasing one of the component's power cap value and decreasing another of the component's power cap value that is not being used frequently by an executing application, the system 100 can optimize performance for the power budget of the system 100 (FIG. 1) per Watt of available power in light of any power consumption limit, as described hereinabove. Note that in order to effect the sample period, the power management logic 109 may comprise a clock (not shown) for determining when the sample period begins and ends.

Further note that the method used to obtain a current value in order to calculate power consumed by a particular component is specific to the component monitored. For example, if the component is a memory subsystem, the memory subsystem may comprise a controller that receives requests from the subsystem for bandwidth, for example. Such a controller may be configured to monitor the amount of current that the memory subsystem is pulling from the power source, and in so monitoring, the controller may obtain a current value via methods known in the art or future-developed, and store a value indicative of the current that is being drawn from the power source.

As an example, application 112 may perform numerous memory accesses. However, the application 112 may not require frequent and extensive CPU transactions. In such an example, the memory subsystem 105 may require 3.0 Volts to operate. Further, the power cap for the memory subsystem 105 may be set at 30 Watts, which translates into 10 amperes, i.e., 30 Watts divided by 3.0 Volts. The power management logic 109 monitors the current draw of the memory subsystem 105 over a sample period to determine the percentage of time that the memory subsystem 105 reaches the power cap during the sample period.

In so monitoring, the power management logic 109 may periodically store data indicative of the current being drawn by the memory subsystem 105 a plurality of times during the sample period. In other words, the logic 109 may periodically sample the current being drawn by the memory subsystem 105 during the sample period. The power management logic 109 may then calculate the number of samples within a specified range (e.g., at or close to) of the power cap value of the memory subsystem 105 to determine the percentage of time that the memory subsystem 105 is reaching or coming substantially near to the power cap. Note that the specified range comprises an upper threshold that is at the power cap value and a lower threshold that is below the upper threshold. In this regard, the percentage equals the number of samples within the specified range divided by the total number of samples taken for the sample period. If the calculated percentage reaches and/or exceeds the upper threshold of the range, then the power management logic 109 may increase the power cap. By increasing the power cap associated with the memory subsystem 105, the power management logic 109 may effectively increase the total power consumed by the system 100 such that it could exceed a system overall power consumption limit, as described hereinabove, unless the logic 109 ensures that the power caps of other components are sufficiently low in light of the increased power cap.

Thus, the power management logic 109 may then dynamically determine if the system will now exceed any prescribed power consumption limit. In order to ensure that the system 100 does not exceed any prescribed power consumption limit of the system 100, the power management logic 109 may then determine if another one of the components is underutilized by the presently executing application 112. For example, the CPU 103 may require 5 Volts to operate. Further, the power cap for the CPU 103 may be set at 50 Watts, which translates into 10 amperes, i.e., 50 Watts divided by 5.0 Volts. The power management logic 109 monitors the current draw of the CPU 103 over a sample period to determine the percentage of time that the CPU 103 reaches its associated power cap.

In so monitoring, the power management logic 109 may store data indicative of the current being drawn by the CPU 103 a plurality of times during the monitored duration. The power management logic 109 may then calculate, based upon the stored current values and the monitored duration, the percentage of time that the CPU 103 is reaching or coming substantially close to the power cap.

If the calculated percentage indicates that the CPU 103 fails to reach the power cap or merely reaches the power cap only a small percentage of the time, then the power management logic 109 may decrease the power cap of the CPU 103 accordingly. By decreasing the power cap during execution of the application 112, the power management logic 109 optimizes performance of the system 100 for the application 112, while still staying within any system power consumption limit.

If, in the instant example, the calculated percentage indicates that the memory subsystem 105 fails to reach the power cap or merely reaches the power cap (e.g., is below the lower threshold of the range) only a small percentage of the time, then the power management logic 109 may retain the present power cap or decrease the power cap accordingly.

During operation, the power management logic 109 may further respond to a current value received from a particular component. In this regard, the power management logic 109 transmits a signal that increases and/or decreases the current that is being drawn based upon a comparison of the received current value translated into a power consumption value and the power cap. Therefore, if the particular current value received from a component translates into a power consumption value that meets or exceeds the power cap identified for the particular component, then the power management logic 109 may transmit a signal to slow down operation of the particular component. While performance may be affected, power is conserved at least and until the power management logic 109 determines that the component's associated power cap is to be increased, e.g., the computing system 100 is experiencing heavy traffic due to a particular application 112-114 that is executing on the system 100.

Likewise, if a particular current value received from a component translates into a power consumption value that falls significantly below the power cap identified for the particular component, then the power management logic 109 may transmit a signal to speed up operation of the particular component. In this regard, performance may be improved while the component is still operating well below the component's associated power cap at least and until the power cap is decreased.

With respect to the memory subsystem example, during a monitored duration, the memory subsystem 105 operating at 3 Volts may draw 11 amperes, while the power cap is set at 30 Watts. Thus, the power management logic 109 determines, based upon the 11 amperes, that the memory subsystem 105 is consuming 33 Watts, which exceeds the power cap of 30 Watts. The power management logic 109 stores data indicative of the current draw, e.g., 11 amperes, or indicating that the memory subsystem 105 exceeded the power cap. Further, in response to the determination that the memory subsystem exceeded the power cap based upon one current value obtained, the power management logic 109 may transmit a signal to decrease the operating bandwidth of the memory subsystem 105. Decreasing the operating bandwidth slows the memory subsystem 105 thereby decreasing the power being consumed by the memory subsystem. Such a signal, with respect to the memory subsystem 105, may be transmitted to bandwidth limiting device (not shown) that increases and/or decreases the bandwidth of the memory subsystem 105. Note that such bandwidth-limiting device is one that is known in the art or future-developed for limiting bandwidth of memory. Notably, however, decreasing the memory subsystem bandwidth in order to limit power being consumed by the memory subsystem 105 can affect the memory subsystem's performance.

Thus, at the expiration of a monitored duration, the power management logic 109 may determine that the memory subsystem 105 is drawing 10 amperes or greater seventy-five percent of the duration. Based upon such a determination, the power management logic 109 may increase the power cap of 30 Watts, i.e., 10 Amperes, to 40 Watts, i.e., approximately 13 Amperes.

Increasing the power cap of the memory subsystem 105 may increase the power consumption of the system 100 overall, as described hereinabove. Therefore, in order to ensure that power consumption limits of the system 100 overall are not exceeded, the power management logic 109 may decrease a power cap associated with a component that is not being used over the particular duration as frequently as the memory subsystem 105.

Indeed, during the monitored duration, the CPU 103 operating at 5 Volts may draw 5 amperes, while the power cap is set at 50 Watts. Thus, the power management logic 109 determines, based upon the 5 amperes, that the CPU 103 is consuming 25 Watts, which falls well below the power cap of 50 Watts. The power management logic 109 stores data indicative of the current draw, e.g., 5 amperes, or indicating that the CPU 103 fell below the power cap. Further, in response to the determination the CPU 103 fell below the power cap based upon one current value obtained, the power management logic 109 may transmit a signal to increase the operating speed of one of the CPU 103. Increasing the operating speed increases the speed of the CPU 103 thereby increasing the power being consumed by the CPU 103. Such a signal, with respect to the CPU, may be transmitted to the CPU to change the operating frequency of the CPU 103, thereby increasing and/or decreasing current being drawn by the CPU 103.

In the instant example, if at the expiration of a monitored duration the power management logic 109 determines that the CPU 103 is drawing 5 amperes greater than at least seventy-five percent of the duration, the power management logic 109 may decrease the power cap of 50 Watts or some other specified amount. By decreasing the power cap of the CPU 103, and thus the power possibly consumed by the CPU 103, the power management logic 109 can ensure that the increase in the power cap for the memory subsystem 105 for the particular application 112 does not result in any power consumption limit being exceeded by the system 100.

Figure 3:
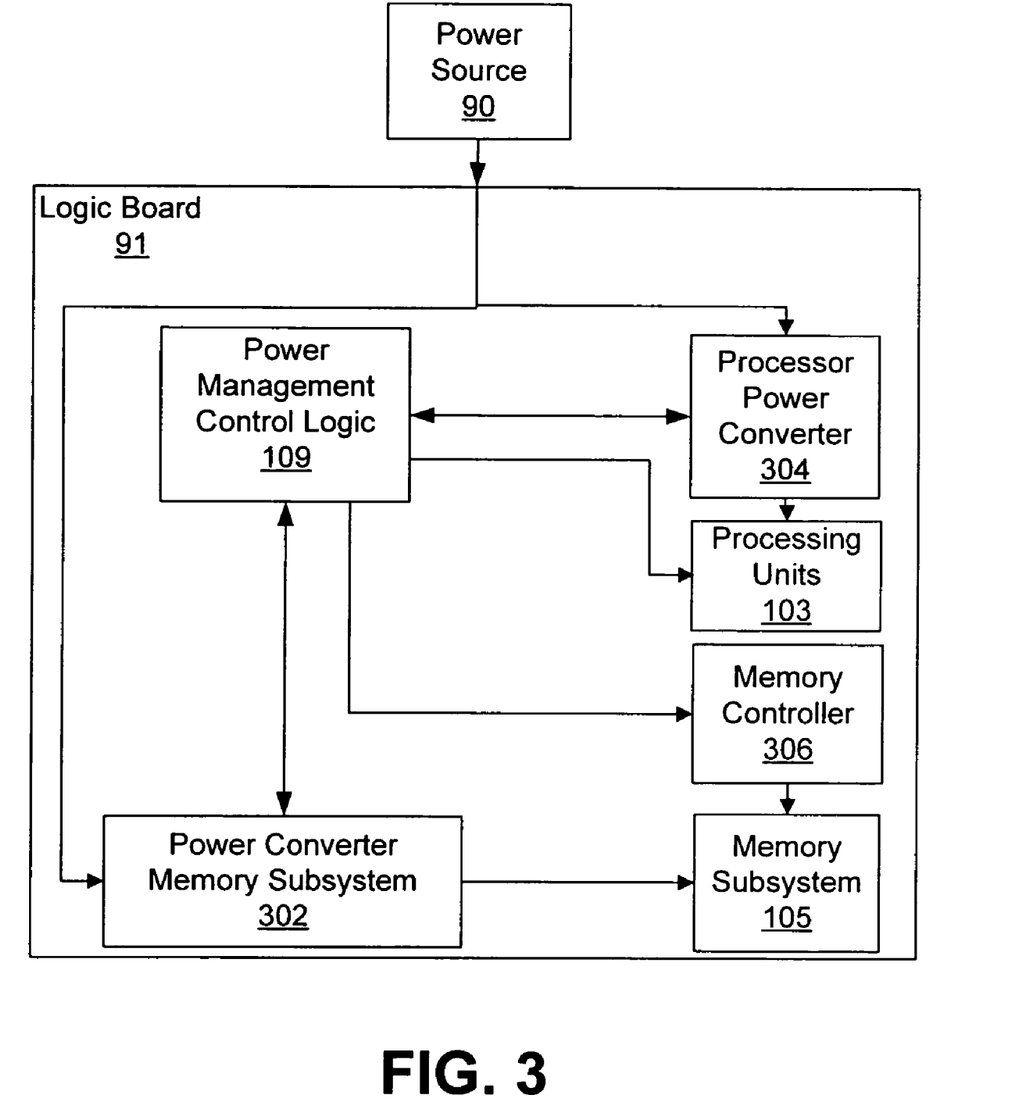
FIG. 3 is a block diagram illustrating an exemplary logic board, such as is depicted in FIG. 2.

FIG. 3 depicts an exemplary logic board 91 in accordance with an embodiment of the present disclosure. In such an embodiment, voltage applied to the logic board 91 by power source 90 is directed to a power converter 302 and a power converter 304. Power converter 302 converts the applied voltage into a voltage in accordance with the specifications for the memory subsystem 105. For example, a particular subset (piece of the die of the microchip embodying the memory subsystem 105) of the memory subsystem 105 may require 1.8 Volts. Thus, the power converter 302 converts the voltage applied to the logic board 91, e.g., 5 Volts provided by the power source 90 (FIG. 1), to the 1.8 Volts necessary to power the subset of the memory subsystem 105. The power converter 302 then applies the converted voltage to the memory subsystem 105.

Further, the processing units 103 may require 3.3 Volts core voltage. Thus, the power converter 304 converts the voltage applied to the logic board 91, e.g., 5 Volts provided by the power source 90 (FIG. 1), to the 3.3 Volts needed by the processing units 103. The power converter 304 then applies the converted voltage to one or more processing units 103.

In one embodiment, the power converters 302 and 304 periodically transmit data to the power management logic 109 indicating quantitatively the current being drawn by the memory subsystem 105 and the CPU 103, respectively. In another embodiment, the power management logic 109 periodically polls the current draw of the power converters 302 and 304. Thus, the power management logic 109 monitors the current draw of the particular component of the power converters 302 and 304 over a particular duration, for example when a particular application 112-114 is executing. Note that while memory subsystem 105 and CPU 103 are shown as exemplary monitored components for which the power management logic 109 can increase and/or decrease the current, other components may be monitored and controlled in other embodiments. The memory subsystem 105 and CPU 103 are described for exemplary purposes only.

In one embodiment, the power management logic 109 determines the percentage of time that the current values being monitored reach or exceed the component's corresponding power cap. The power management logic 109 can make such a determination by performing a calculation on each received current value and incrementing a counter (not shown), if the value falls within a specified range. Alternatively, the power management logic 109 may store the current values, and once the monitored duration has expired, the power management logic 109 may perform a comparison of each value stored to the present power cap.

The power management logic 109 then calculates the percentage of time that the current value being drawn by the particular component exceeded the power cap during the sample period. If the current exceeded the power cap more than a predetermined percentage of the time, e.g., seventy-five percent, then the power management logic 109 may dynamically increase the power cap used in comparison to the current values retrieved from the components. In another embodiment, if the current fell significantly below the power cap more than a predetermined percentage of the time, e.g., seventy-five percent, then the power management logic 109 may dynamically decrease the power cap used in comparison to the current values retrieved from the components in order to offset any increased power cap on another component.

Furthermore, during operation, if a current value received exceeds the power cap, the power management logic 109 transmits a signal to control operation of the component associated with the received current value, as described hereinabove. For example, a current value received from the power converter 302 indicates that the memory subsystem 105 has exceeded the power cap. The power management logic 109 transmits a signal to a memory controller 306, in response to the signal, which decreases the issue rate of the memory subsystem 105. In this regard, the memory controller 104 may comprise bandwidth-limiting hardware, for example, that speeds up or slows the issue rate of the memory subsystem 105. Upon receipt, the memory controller 306 may slow the issue rate in order to reduce power being consumed by the memory subsystem 105.

Furthermore, a current value received from the power converter 302 indicates that the memory subsystem 105 has significantly fallen below the power cap. In response, the power management logic 109 may transmit a signal to the memory controller 306 that speeds up the issue rate of the memory subsystem 105. Upon receipt, the memory controller 306 may speed up the issue rate in order to increase performance of the memory subsystem 105.

Note that the power management logic 109 may use the data indicative of the current drawn by a particular component to dynamically determine the power that is being consumed by the component. The power management logic 109 compares the power being consumed with the power consumption cap. In one embodiment, the power management logic 109 may also store data indicative the maximum power consumed over the monitored duration or an average of the power consumed over the monitored duration. In this regard, the power management logic 109 uses the maximum power consumed or the average power consumed to calculate a current increase and/or decrease value. Thus, the power management logic 109 may also increase and/or decrease the current being drawn by the particular component based upon the maximum power consumed over a monitored duration.

Likewise, if the component has met or exceeded the power consumption cap a predetermined percentage of the time, the power management logic 109 may then increase the power consumption cap associated with the particular element.

As an example, during operation, the power management logic 109 may query power converter 302 to transmit data indicative of the current supplied to the memory subsystem 105. The power converter 302 may send data indicating that the memory subsystem 105 is operating at 10 amps. The power management logic 109 determines the power being consumed by the component and compares the power being consumed to the power consumption cap, e.g., 30-Watts.

Figure 4:
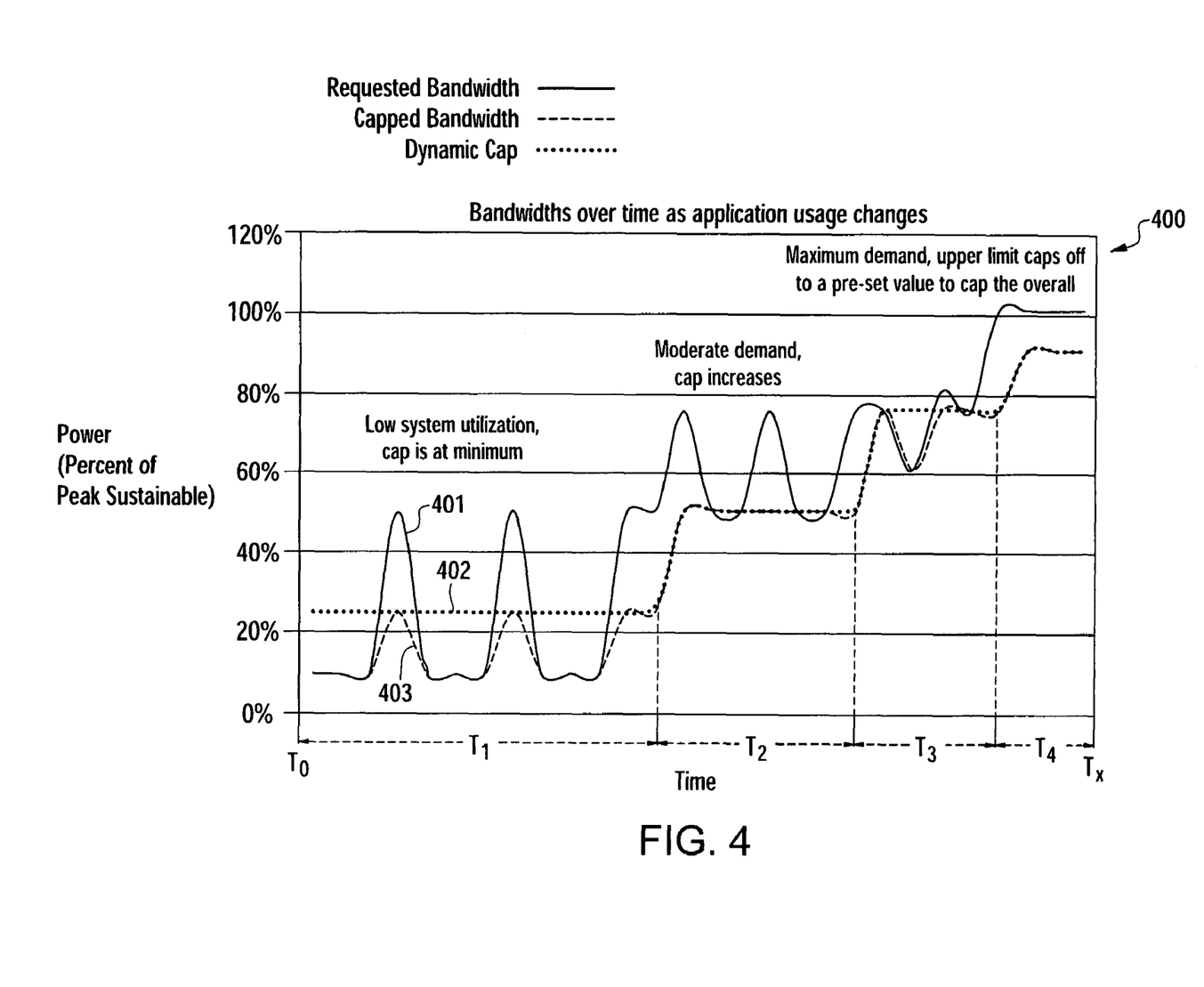
FIG. 4 is a graph depicting power, as a percentage of peak sustainable, versus time for one exemplary embodiment of a computing system, such as is depicted in FIG. 1.

FIG. 4 is a graph depicting exemplary power consumption behavior of a component of the computing system 100 in accordance with an embodiment of the present disclosure. The graph comprises three lines including a requested bandwidth line 401, a capped bandwidth line 402, and a power consumption cap 403. Each of the lines 401-403 show changes in response to, for example, an executing application 112-114 (FIG. 2) on the logic board 91 or any other type of increased traffic on computing system 100 (FIG. 1).

Specifically, over duration T1, the memory subsystem requested bandwidth is indicated by line 401. However, the power consumption for the memory subsystem 105 is capped at approximately 20% of peak sustainable power, as indicated by the dotted line 402. Therefore, the dashed line 403 indicates the actual bandwidth provided to the memory subsystem 105.

Over time period T1, however, the power management logic 109 monitors the power consumed, and stores data indicating that over duration T1, the power consumed exceeded the cap, i.e., increased to approximately 40% of peak sustainable power approximately 50% of the time during the duration T1.

Therefore, the power management logic 109 increases the cap to approximately 40% peak sustainable power, as indicated during duration T2 as indicated by line 402. Again, the power management logic 109 monitors the requested bandwidth indicated by line 401, which is now exceeding the 40% peak sustainable mark during duration T2. Therefore, the power management logic 109 increases the memory subsystem power cap again, as indicated by line 402.

Accordingly, during duration $T_3$, the memory subsystem 105 continues to request bandwidth over and above the power cap as indicated by line 401. Thus, the power management logic 109 increases the power cap again as shown in duration $T_4$.

Notably, the bandwidth of the memory subsystem 105 is capped as indicated by line 403. In this regard, the power management logic 109, during durations $T_1$, $T_2$, $T_3$, and $T_4$, the power management logic 109 prohibits the memory subsystem 105 from receiving any bandwidth over and above the capped bandwidth indicated by line 402. However, as the bandwidth increases while the power management logic 109 monitors power usage of the memory subsystem 105, the power management logic 109 increases the power cap of the memory subsystem 105.

Figure 5:
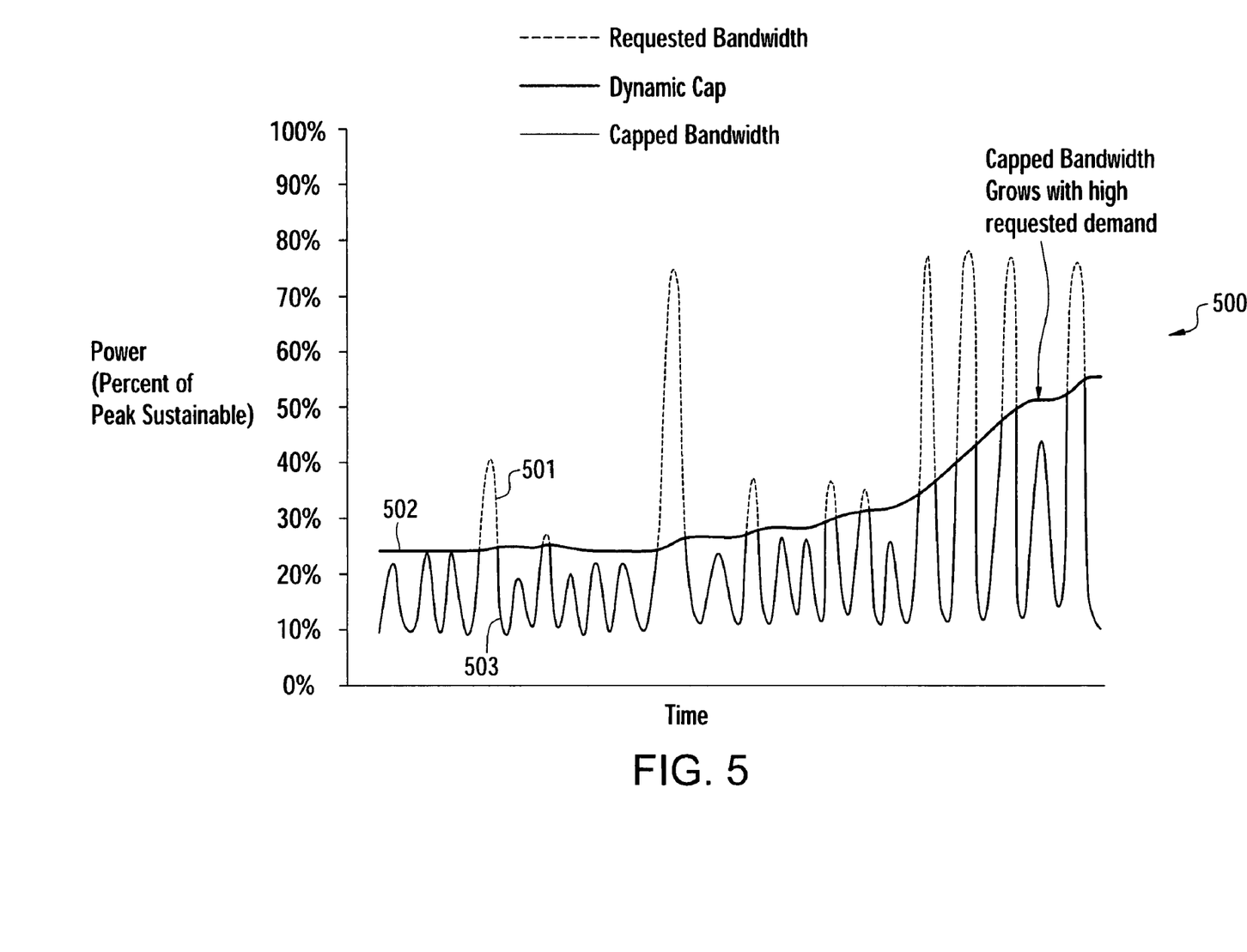
FIG. 5 is another graph depicting power, as a percentage of peak sustainable, versus time for another exemplary embodiment of a computing system, such as is depicted in FIG. 1.

FIG. 5 is a graph 500 depicting exemplary power consumption behavior of the a component of the system 100 in accordance with an embodiment of the present disclosure. The graph comprises three lines including a requested bandwidth line 501, a dynamic power consumption cap line 502, and capped bandwidth line 503. Each of the lines 501-503 show changes in response to, for example, an executing application 112-114 (FIG. 2) on the logic board 91 or any other type of increased traffic on computing system 100 (FIG. 1).

Over time, the power management logic 109 monitors the requested bandwidth as indicated by line 501. As the incidents of the requested bandwidth increases, the power management logic 109 dynamically increases the such power cap. Thus, as shown, the more frequently the requested bandwidth exceeds the cap, the faster the power management logic 109 increases the cap.

Figure 6:
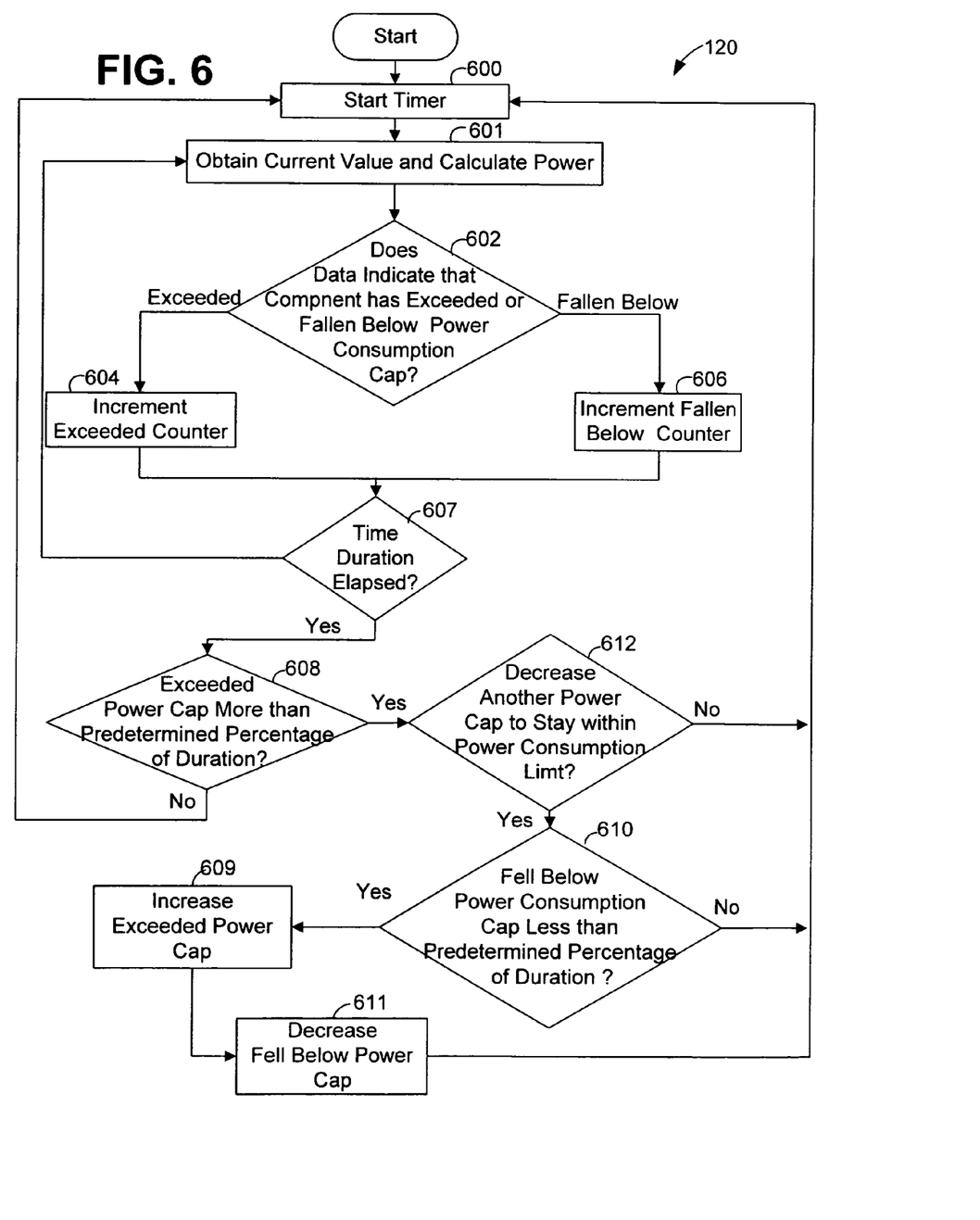
FIG. 6 is a flow chart illustrating an exemplary method for controlling power usage by a plurality of components of a computing system, such as is depicted in FIG. 1.

FIG. 6 is a flowchart illustrating exemplary architecture and functionality of the power management logic 109 of the present disclosure.

As indicated in blocks 600 and 601, the power management logic 109 (FIG. 1) starts a timer and obtains a power consumption value, respectively. As described hereinabove, the power management logic 109 may comprise a timer or use a clock located on the logic board 91 (FIG. 2). As noted herein, the current value obtained may result from a query by the power management logic 109 or from a signal transmitted by the component being monitored.

The power management logic 109 compares the power consumption value obtained with the power consumption cap. If the value indicated exceeds the power cap in block 602, then the power management logic 109 increments an "exceeded" counter indicating that the cap was exceeded in block 404.

If the value indicates that the power consumed falls below the power consumption cap in block 602, then the power management logic 109 stores data indicative of the power consumption in block 505 and increments a "below" counter indicating that the value fell substantially below the power cap in block 606.

The power management logic 109 continues to monitor the power consumption over a period of time. In this regard, in block 607, the power management logic 109 obtains another current value in block 601, if the timer has not elapsed.

If the time period has elapsed in step 607, in step 608 the power management logic 109 determines whether the power consumption cap was exceeded more than a predetermined limit, e.g., more than 50% of the monitored duration. If the power consumption cap was exceeded more than the predetermined limit in step 608, then the power management logic 109 determines whether to decrease another power cap of another component to stay within the power consumption limit in step 609. If the system 100 continues to operate with any prescribed power consumption limit, then it may not be necessary to decrease another power cap of another component. Thus, if the answer is no in step 612, the timer begins again without decreasing any power caps in step 600.

If yes, then the power management logic 109 determines whether there is a component in the system that is being underutilized in that its power consumption has systematically fallen below its power cap less than a predetermined percentage of the duration, in step 610. If no, then the timer begins again in step 600.

For example, the power management logic 109 may determine that the power consumption of another component fell substantially below the power consumption cap more than a predetermined limit, e.g., more than 50% of the time period. If power consumption fell below the power consumption cap more than the predetermined limit in block 610, e.g., more than 50% during the monitored duration, the power management logic 109 increases the exceeded power cap in step 609, and decreases the other power cap of the other component in step 611.

In increasing the exceeded power cap, the power management logic 109 may increase the cap to a value compatible with the maximum power consumed over the duration, as shown in graph 400 (FIG. 4) in step 609. Alternatively, the power management logic 109 may increase the cap a predefined increment if the power cap is exceeded a plurality of times over a monitored duration.

Note that the power management logic 109 may decrease the power cap to a value compatible with the least current value over the duration or an average of the current values over the duration.

Figure 7:
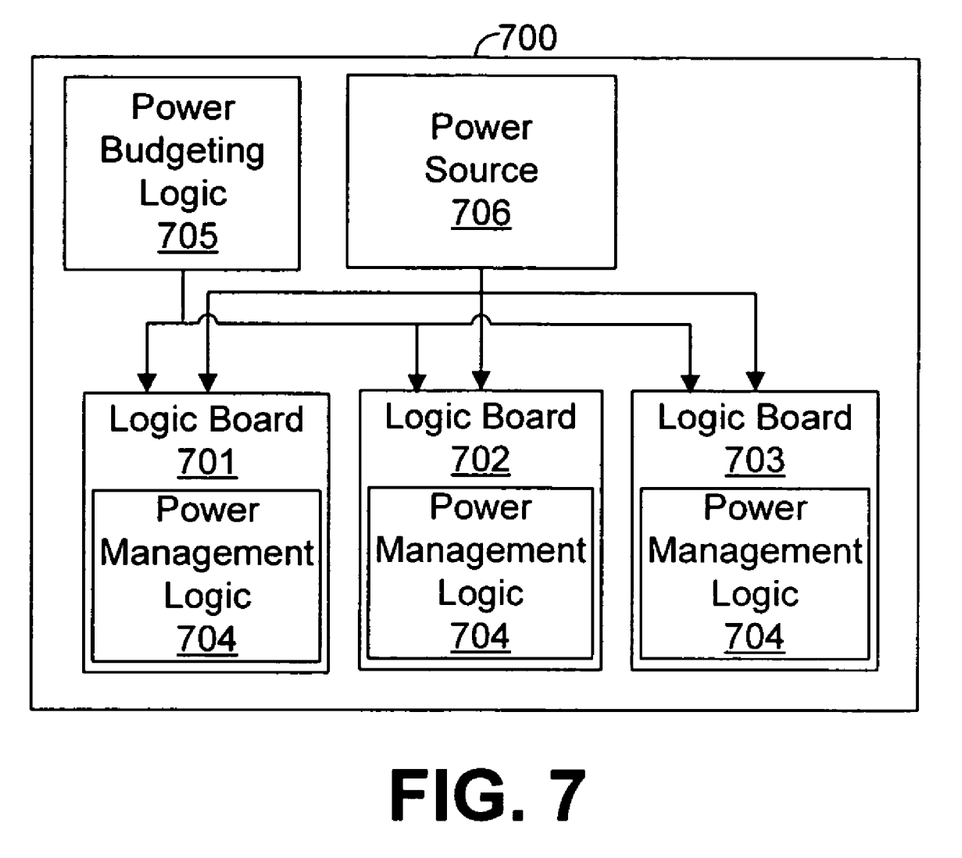
FIG. 7 is a block diagram illustrating a computing system in accordance with an exemplary embodiment of the present disclosure.

FIG. 7 depicts a system 700 in accordance with another embodiment of the present disclosure.

The system 700 comprises a plurality of logic boards 701-703. Each of the logic boards 701-703 may comprise power management logic 704. In addition, the system 700 comprises power budgeting logic 705 and a power source 706.

The power management logic 704 operates substantially similar to the power management logic 109 (FIG. 1) of the computing system 100 (FIG. 1). Thus, the power management logic 704 stores data indicative of at least one power cap associated with a particular component on its respective logic board 701-703. During operation, the power management logic 704 dynamically redistributes power across components on the logic boards 701-703 based upon an executing application's need. In this regard, the power management logic 704 dynamically adjusts each power cap stored based upon dynamically monitored current values translated into power consumption values and compared to the power caps, based on the application's need.

Further, the power management logic 704 transmits signals to components based upon a single current value obtained if the component has exceeded the power cap or fallen substantially below the power cap.

Notably, during operation of system 700, each of the logic boards 701-703 operates substantially independent one from the other. However, a single power source 706 is providing power to the plurality of logic boards 701-703, and the amount of power that the power source 706 can provide to the plurality of logic boards 701-703 is limited, for example, by the ratings of the power source 706. During a particular duration, one or more of the logic boards 701-703 may have increased activity while one or more of the other logic boards 701-703 may experience a transactional lull. Thus, those boards 701-703 that have increased activity may require more power during such a duration, and those that experience a transactional lull may not need as much power.

The power budgeting logic 705 may associate with each of the logic boards 701-703 a power cap and ensure that the logic boards 701-703 operate at or below its associated power cap. In this regard, the logic 705 may provide voltage and/or current limiting as know by those skilled in the art to each of the logic boards 701-705 in order to ensure that the power provided to the boards 701-703 remains at or below the power cap. In addition, the power budgeting logic 705 communicates with each of the power management logic 704.

In this regard, the power management logic 704 tracks the amount of power being consumed by the various components on the logic boards 701-703. If it appears that a logic board 701-703 meets or exceeds is budgeted power cap, as described hereinabove, the power management logic 704 transmits data to the power budgeting logic 705 indicating that the logic board 701-703 is experiencing increased transactional activity. The power budgeting logic 705 then determines if one or more of the other logic boards 701-703 is experiencing decreased activity. If one of the logic boards 701-703 is experiencing decreased activity, then the power budgeting logic 705 may decrease one or more of the power caps associated with the logic board 701-703 that is experiencing decrease activity. In addition, the power budgeting logic 705 may increase the power cap associated with the logic board 701-703 that is experiencing increased activity. Therefore, the power budgeting logic 705 ensures that the power available from the power source 706 is efficiently and effectively distributed among the logic boards 701-703 based upon activity occurring on the logic boards 701-703.

In this regard, the power budgeting logic 705 monitors the power consumption of the logic boards 701-703 and the various components on each of the logic boards 701-703 over a monitored duration. If during the duration, power consumed by one or more of the logic boards 701-703 has fallen below its associated power cap a certain percentage of the time, e.g., seventy-five percent, the power management logic 109 decreases the power consumption cap allotted to the particular logic board 701-703 by the power budgeting logic 109. Likewise, if during the duration, power consumed by one or more of the logic boards 701-703 met its associated power cap a certain percentage of the time, e.g., seventy-five percent, the power budgeting logic 705 increases the power consumption cap allotted to the particular logic board 701-703 by the power budgeting logic 109.

During operation, the power budgeting logic 705 may further store data indicative of power consumption characteristics of the system 700. For example, the power budgeting logic 705 may store data indicative of the voltage rating of the power source 706 and dynamic current readings for each of the logic boards 701-703. Further, the power budgeting logic 705 may store data indicative of power caps associated with each of the logic boards 701-703 and power caps associated with components (not shown) on each of the logic boards 701-703.

During operation, the power budgeting logic 705 may monitor the logic boards 701-703 by communicating with the power management logic 704 on each of the boards 701-703. In this regard, the power budgeting logic 705 may monitor, for example, the power being consumed over a particular duration by each of the logic boards 701-703.

Thus, the power budgeting logic 705 may determine, based upon dynamic power information received from the logic boards 701-703, that one or more of the logic boards 701-703 is particularly active while another is not. Therefore, the power budgeting logic 705 may signal one of the boards 701-703 to slow or speed up based upon the monitored power usage in order to maximize performance and/or minimize power usage of the system 700. In this regard, the power budgeting logic 705 may enable one board 701-703 to increase their power usage and, in turn, signal another board to decrease its power usage. Therefore, power consumption of the system 700 as a whole is monitored and controlled, as described hereinabove. Note that, as described herein, FIG. 7 depicts the system 700, e.g., a server, comprising the plurality of logic boards 701-703. However, the aforedescribed power budgeting logic 705 may be implemented in a system comprising a plurality of servers (not shown). In this regard, the power budgeting logic 705 may increase a power cap associated with one of the plurality of servers, if the server appears to be experiencing increased activity. Likewise, the power budgeting logic 705 may decrease a power cap associated with a server that is experiencing decreased activity.

The invention claimed is:

1. A system, comprising:
a plurality of electronic components powered by a power source and respectively associated with power caps, the plurality of electronic components including at least a first electronic component associated with a first power cap and a second electronic component associated with a second power cap; and
logic configured to monitor power consumption of the electronic components over a duration and to limit power consumed by the first electronic component based on the first power cap, the logic configured to limit a power consumed by the second electronic component based on the second power cap and to ensure that a total power consumed by all of the electronic components is limited to an overall power limit, the logic configured to dynamically increase the first power cap based on an amount of power consumed by the first electronic component, the logic further configured to decrease the second power cap in response to the increase of the first power cap such that the total power consumed by all of the electronic components is prevented from exceeding the overall power limit.

2. The system of claim 1, wherein the logic is further configured to request, from a controller of the first electronic component, a plurality of current values during the monitored duration.

3. The system of claim 1, wherein the logic is further configured to determine a value indicative of how often the power consumed by the first electronic component exceeds a specified limit.

4. The system of claim 3, wherein the logic is further configured to increase the first power cap if the value indicates that the power consumed by the first electronic component exceeds the specified limit at least a predetermined percentage of the duration.

5. The system of claim 1, further comprising a controller configured to transmit, to the logic, data indicative of current values associated with the first electronic component.

6. The system of claim 1, wherein the logic is configured to increase the first power cap in response to a determination that the power consumed by the first electronic component over the monitored duration exceeds the first power cap at least a predetermined percentage of the duration.

7. The system of claim 1, wherein the logic is configured to decrease the first power cap in response to a determination that the power consumed by the first electronic component over the monitored duration falls below the first power cap at least a predetermined percentage of the duration.

8. A method, comprising:
monitoring power consumption of a plurality of electronic components over a duration, the plurality of electronic components including at least a first electronic component and a second electronic component;
limiting power consumed by the first electronic component based on a first power cap associated with the first electronic component;
limiting power consumed by the second electronic component based on a second power cap associated with the second electronic component;
dynamically increasing the first power cap based on the monitored power consumption; and
ensuring that a total power consumed by all of the electronic components is limited to an overall power limit, the ensuring comprising decreasing the second power cap in response to the increasing the first power cap.

9. The method of claim 8, further comprising determining a value indicative of how often power consumed by the first electronic component exceeds a specified limit.

10. The method of claim 9, wherein the increasing is based on the determined value.

11. A system, comprising:
- a first electronic component associated with a first power cap;
- a second electronic component associated with a second power cap; and
- logic configured to dynamically monitor power consumption of the first and second components the logic configured to limit power consumed by the first electronic component based on the first power cap and to limit power consumed by the second electronic component based on the second power cap, the logic configured to ensure that a total power consumed by a plurality of electronic components including at least the first and second electronic components is limited to an overall power limit, the logic further configured to increase the first power cap in response to an increase in power consumption by the first electronic component and to decrease the second power cap in response to the increase of the first power cap so that the overall power limit is not violated due to the logic increasing the first power cap.

12. The system of claim 11, wherein the logic is further configured to determine values indicative of how often power consumed by the first and second electronic components exceeds a specified limit.

13. The system of claim 12, wherein the logic is further configured to increase the first or second power cap if one of the values exceeds a threshold value.

* * * * *

UNITED STATES PATENT AND TRADEMARK OFFICE
CERTIFICATE OF CORRECTION

| | |
|---|---|
| PATENT NO. | : 7,539,881 B2 |
| APPLICATION NO. | : 11/404455 |
| DATED | : May 26, 2009 |
| INVENTOR(S) | : Mark E. Shaw et al. |

It is certified that error appears in the above-identified patent and that said Letters Patent is hereby corrected as shown below:

On the title page, item (54), in "Title", in column 1, line 1, delete "SYSTEM AND METHOD" and insert -- SYSTEMS AND METHODS --, therefor.

In column 1, line 1, delete "SYSTEM AND METHOD" and insert -- SYSTEMS AND METHODS --, therefor.

In column 17, line 13, in Claim 11, delete "components" and insert -- components, --, therefor.

Signed and Sealed this

Fifteenth Day of September, 2009

David J. Kappos
*Director of the United States Patent and Trademark Office*